(12) United States Patent
Shivanna et al.

(10) Patent No.: US 11,966,475 B2
(45) Date of Patent: Apr. 23, 2024

(54) SECURITY LEVEL-BASED AND TRUST-BASED RECOMMENDATIONS FOR SOFTWARE COMPONENTS

(71) Applicant: HEWLETT PACKARD ENTERPRISE DEVELOPMENT LP, Houston, TX (US)

(72) Inventors: Suhas Shivanna, Karnataka (IN); Matthew Yang, Houston, TX (US); Craig Rubin, Peachtree Corners, GA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 679 days.

(21) Appl. No.: 17/080,526

(22) Filed: Oct. 26, 2020

(65) Prior Publication Data

US 2022/0129561 A1 Apr. 28, 2022

(51) Int. Cl.
| | |
|---|---|
| G06F 21/57 | (2013.01) |
| G06F 16/951 | (2019.01) |
| G06F 21/62 | (2013.01) |
| G06N 20/00 | (2019.01) |
| H04L 9/40 | (2022.01) |

(52) U.S. Cl.
CPC .......... G06F 21/577 (2013.01); G06F 16/951 (2019.01); G06F 21/629 (2013.01); G06N 20/00 (2019.01); H04L 63/105 (2013.01); G06F 2221/033 (2013.01)

(58) Field of Classification Search
CPC ...... G06F 21/57; G06F 21/577; G06F 21/629; G06F 2221/033; G06F 2221/034; G06F 16/906; G06F 16/951; H04L 63/1433; G06N 20/00
See application file for complete search history.

(56) References Cited

U.S. PATENT DOCUMENTS

| | | | | |
|---|---|---|---|---|
| 10,579,803 | B1 * | 3/2020 | Mueller | G06F 21/577 |
| 2012/0240096 | A1 | 9/2012 | Sass | |
| 2017/0372072 | A1 * | 12/2017 | Baset | G06F 11/3604 |
| 2019/0079734 | A1 * | 3/2019 | Kadam | G06F 8/71 |
| 2019/0303770 | A1 * | 10/2019 | Vannini | G06N 20/00 |

(Continued)

OTHER PUBLICATIONS

Microsoft Computer Dictionary, 2002, Microsoft, Fifth Edition, pp. 493.*

(Continued)

Primary Examiner — Minh Dinh
(74) Attorney, Agent, or Firm — Trop, Pruner & Hu, P.C.

(57) ABSTRACT

A method includes accessing an input representing a software component list for a software product. The software component list contains information for a given software component. The method includes accessing a knowledge base to determine security level parameters and trust parameters for the given software component based on the information. A security level of the given software component is determined based on an evaluation of the security level parameters. A trust of a source of the given software component is determined based on an evaluation of the trust parameters. The method includes determining a security context of the software product. Based on the security level, the trust and the security context, the method includes providing a recommendation for the given software component.

19 Claims, 9 Drawing Sheets

(56) References Cited

U.S. PATENT DOCUMENTS

| | | |
|---|---|---|
| 2020/0153850 A1 | 5/2020 | Krishnan et al. |
| 2020/0167476 A1 | 5/2020 | Boulton |
| 2020/0202007 A1 | 6/2020 | Nagaraja et al. |
| 2020/0311281 A1* | 10/2020 | Boulton ................ G06F 21/577 |
| 2021/0056209 A1* | 2/2021 | Fox ........................ G06F 21/57 |
| 2021/0397717 A1* | 12/2021 | Shwartz ............. G06Q 10/0635 |

OTHER PUBLICATIONS

Chief Information Officer: U.S. Department of Defense, "DoD Open Source Software (Oss) Faq: What policies address the use of open-source software in the Department of Defense?," available online at <https://web.archive.org/web/20201005182721/https://dodcio.defense.gov/Open-Source-Software-FAQ/>, Oct. 5, 2020, 4 pages.

Dr. David A. Wheeler, "Core Infrastructure Initiative (CII) Best Practices Badge in 2019," IDA, Mar. 14, 2019, pp. 1-47.

Software Composition Analysis How to Choose the Right Solution?, (Web Page), Downloaded Aug. 18, 2020, 6 Pgs.

* cited by examiner

SECURITY LEVEL-BASED AND TRUST-BASED RECOMMENDATIONS FOR SOFTWARE COMPONENTS

BACKGROUND

The use of open source software is ever-increasing due to a number of advantages that extend beyond no license fees being charged for its use. For example, open source software promotes collaboration among software developers from many different business enterprises and even from individuals that have no enterprise affiliations. Due to this collaboration, performance of a given open source software component may be improved; security vulnerabilities of the component may be identified; errors, or bugs, in the component may be identified; fixes for security vulnerabilities may be incorporated into the component; and so forth.

DETAILED DESCRIPTION

Figure 1:
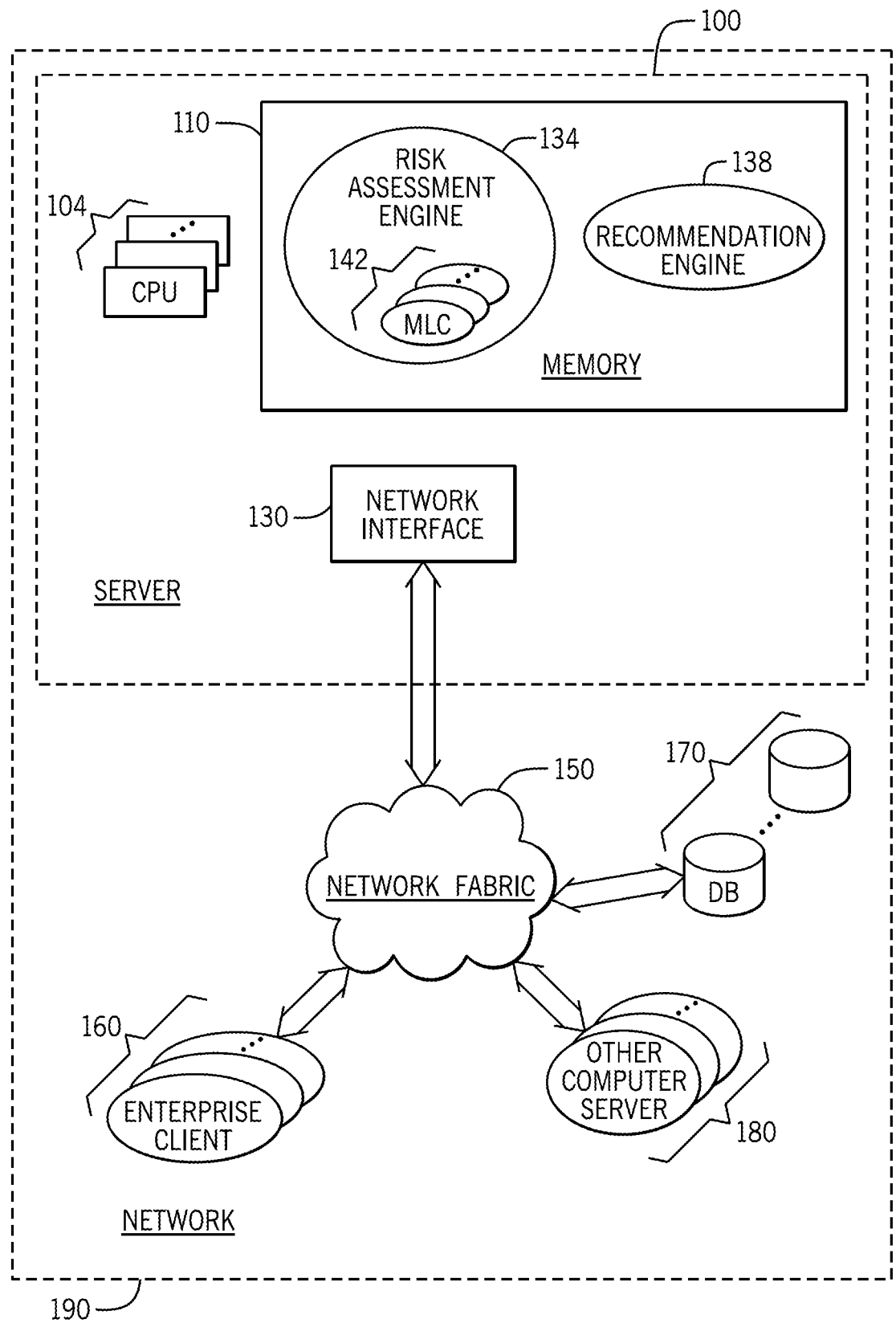
FIG. 1 is a schematic diagram of a network according to an example implementation.

A given software product may have one or multiple open source software components. In this context, an "open source software component" refers to a unit of machine executable instructions, or "software," such as a library file, a utility, an executable, binary code, source code, and so forth, in which an exclusive owner or an exclusive set of owners do not control the rights to copy, inspect and/or alter the unit of software. As such, the open source software components may be used, distributed and modified by software developers that are individuals, affiliated with different business enterprises, and so forth. Moreover, the open source software components may be incorporated into software products that are distributed and/or sold by such entities.

A given open source software component may be associated with a license that may affect the way that developers may use, study, modify and distribute the software. For example, a given open source software component may allow any modification for any purpose but may stipulate, for example, that a release of a modified version of the open source software component is to be accompanied by the corresponding source code. Moreover, a given open source software component license may stipulate, for example, that there are not to be any licensing fees associated with sharing the program's source code. Regardless of the many different types of open source software component licenses, in general, in the context of this application, an "open source software component" refers to any unit of machine executable instructions, or "software," which is not exclusively owned and which may be inspected and modified.

A challenge with a developer evaluating an open source software component and deciding whether to incorporate the component into a composite software product (which may contain many open source and non-open source (or "proprietary") components) is that it may be relatively difficult for the developer to assess the degree to which the open source software component is trusted (e.g., assess the degree or extent of a confidence, belief or assurance that the software component does not have intentionally or non-intentionally created vulnerabilities, exposures or problems, and the software component will perform as expected) and assess its security level of the component (e.g., assess the extent of security measures affiliated with the software component, such as download security practices, integrity verification of code, vulnerabilities, and so forth). Open source software components may be associated with many different communities and many different individual contributors. Currently, there are millions of open source software components that have different security practices and levels of functionality. Some of the open source software components may be delivered by well-known communities, while other components may be delivered by, for example, developers working from home or small remote offices. In many cases, it may be challenging for a developer to determine the security methodology and practices that have been utilized in producing the open source software components. Additionally, a given open source software component may be acquired in many different forms, such as an open source software component that may be downloaded in source code form or in a compiled binary.

One solution for a developer to assess the security implications of using a particular open source software component is for the developer to undertake measures to validate the security level of the open source software component. However, usability and business agility of such measures may cause a deviation from established security practices, and there may be a lack of consistency in risk management for the selection of the open source software components. Additionally, many developers may be unaware of the appropriate criteria to employ to measure the security level provided by an open source software component and the degree of trust to be attributed to the open source software component. Moreover, the appropriate criteria to apply when assessing open source software components may be ever changing in light of the ever-increasing number and complexities of security threats.

In accordance with example implementations that are described herein, a security recommendation system evaluates a software component for potential inclusion in a software product and provides recommendations based on the evaluation. As an example, in accordance with some implementations, the software component may be an open source software component, i.e., a software component that, in general, may be modified and shared as part of a collaborative effort between developers, individuals, and so forth, which may belong to different software development communities, enterprises, and so forth. In accordance with example implementations, the security recommendation system determines an overall risk for a given software component based on a determined security level of the software component and a determined degree of trust of the software component.

In accordance with example implementations, the security recommendation system also determines a security context for a product that is planning to use the software component. Here, the "security context" refers to a degree of overall security for the composite software product that is to potentially incorporate the software component, such as, for example, a degree of overall security that is commensurate with the particular industry that is affiliated, or associated, with the software product. For example, if the software product is to be used in the banking industry or for the military, then the corresponding security context equates to a relatively high degree of security for the software product. Conversely, if the software product is, for example, a product that corresponds to a widely distributed and generally publicly-used application or utility, then the corresponding security context may equate to a relatively lower degree of security for the software product.

In the context of this disclosure, a "recommendation" for a software component refers to guidance, such as a suggestion or proposal, pertaining to the use of the software component in the software product. As examples, a recommendation may be a suggestion or proposal pertaining to use or not use the software component in the software product. The recommendation may, however, be a compound suggestion or proposal, such as, for example, a recommendation to condone use of the software component in the software product, along with one or multiple conditions for this use to occur. As examples, the conditions may be for the software component to pass a specified malware analysis before the component is to be used; the software component to be evaluated by and passes a particular static source code analysis; certain security aspects of software development lifecycle (SDL) practices are to be observed for the software component; and so forth.

In general, the security recommendation system, in accordance with example implementations, allows monitoring of a changing security threat landscape, as well as monitoring of various parameters that may affect the determined security level, and/or trust of the software component, i.e., may affect the assessed overall risk for the software component. By monitoring the security threat landscape, the security recommendation system adapts accordingly to implement current state of the art established security practices and provide consistency in risk management for the selection of software components.

Referring to FIG. 1, as a more specific example, in accordance with some implementations, an electronic device, such as a computer system or a server 100, may provide a security recommendation system for assessing trust and security levels of software components (e.g., open source software components); evaluating security context of products that may use the software components; and provide corresponding recommendations for the software components, including such recommendations as whether or not to use the software components in certain products and/or risk mitigation measures to employ if the software components are used.

For the example implementation illustrated in FIG. 1, the electronic device is a server 100 that is an actual physical machine that includes actual hardware and actual machine executable instructions (or "software"). More specifically, in accordance with example implementations, the physical machine may include such hardware as one or multiple central processing units (CPUs), memory devices that form a memory 110, one or multiple network interfaces 130, one or multiple input/output (I/O) devices (e.g., monitors, a mouse, a keyboard, and so forth); etc. The memory 110, in general, represents a non-transitory storage medium that may be formed from semiconductive storage devices, memristors, magnetic storage, phase change memory devices, a combination of one or more of the foregoing or other storage technologies, and so forth. Moreover, the memory 110 may include volatile memory, non-volatile memory, or a combination of volatile and non-volatile memory.

As examples, the server 100 may be a blade, one or multiple rack-mounted modules, a desktop computer, a laptop computer, a smartphone, a tablet computer, a wearable computer, and so forth, depending on the particular implementation. Moreover, although described herein as a non-virtual system, the security recommendation system may be formed from one or more virtual components, in accordance with some implementations. For example, the security recommendation system may include one or multiple virtual machines, may be part of one or more virtual environments inside corresponding container(s), and so forth.

As depicted in FIG. 1, in accordance with some implementations, machine executable instructions may be stored in the memory 110 and executed by one or multiple CPUs 104 for purposes of forming software-based components (called "engines" herein) of the security recommendation system. More specifically, as depicted at reference numeral 134, in accordance with example implementations, the memory 110 stores machine executable instructions that, when executed by one or multiple CPUs 104, form a risk assessment engine 134. In accordance with example implementations, the risk assessment engine 134 receives, or accesses, data representing a list of all or certain candidate software components to be potentially used in a particular software product. For example, in accordance with some implementations, the list may include candidate open source software components. As another example, in accordance with some implementations, the list may include third party software components (e.g., non-open source software components that are not considered to be proprietary software components of the business enterprise that provides the software product and are provided by an entity other than the business enterprise).

As described further herein, in accordance with example implementations, the risk assessment engine 134 determines overall risk scores for the corresponding software components on the list based on intrinsic features (e.g., attributes) of the software components as well as extrinsic features of the software components, which are derived from sources other than the software components themselves, such as parameters derived from open source communities, knowledge databases, portals, and so forth. More specifically, as described further herein, in accordance with some implementations, the risk assessment engine 134 determines the overall risk score for a given software component based on a trust score that represents a determined degree of trust (e.g., a trust score derived from the evaluation of trust parameters, such as parameters that represent whether the source code is signed, whether there is support for a secure download connection, whether a community associated with the component is obsolete, and so forth) and a security score that represents a determined degree of security risk (e.g., a security level score derived from the evaluation of security level parameters, such as a responsiveness of the community to identified vulnerabilities, whether there is a code integrity check for the component, the strength of ciphers and security protocols used by the component, and so forth). In accordance with some implementations, the risk assessment engine 134 may, as further described herein, use one or multiple machine learning classifiers 142 to determine the overall risk score for a given software component based on the intrinsic and extrinsic features of the software component.

As depicted at reference numeral 138, in accordance with example implementations, one or multiple CPUs 104 may execute machine executable instructions that are stored in the memory 110 to form a recommendation engine 138 of the security recommendation system. In accordance with example implementations, the recommendation engine 138 applies a set of rules to the overall risk score provided by the risk assessment engine 134 and a determined security context for the software product for purposes of producing a corresponding recommendation for a software component. The recommendation may be, for example, a recommendation to use the evaluated software component, not use the evaluated software component, use the software component with certain mitigation measures being used, and so forth.

For the example implementation that is depicted in FIG. 1, the server 100 is part of a network 190. As examples, in accordance with some implementations, the server 100 may be part of an enterprise network and include enterprise clients 160 that communicate with the server 100 via network fabric 150. In general, the network fabric 150 may include components and use protocols that are associated with one or multiple types of communication networks, such as (as examples) Fibre Channel networks, iSCSI networks, ATA over Ethernet (AoE) networks, HyperSCSI networks, Gen-Z fabrics, dedicated management networks, local area networks (LANs), wide area networks (WANs), global networks (e.g., the Internet), wireless networks, or any combination thereof.

For example, in accordance with some implementations, a given enterprise client 160 may communicate with the server 100 for purposes of providing data describing the product and an associated software component list that details information about potential software components to be included in the software product. Using the services described herein provided by the server 100, a developer may then receive, through the enterprise client 160, recommendations for the software components on the list.

As also depicted in FIG. 1, in accordance with some implementations, the network 190 may also allow communication of the server 100 with other computers, such as servers 180. For example, the servers 180 may provide express extrinsic information about the source software components pertaining to the trust and/or security levels of the components, such as known vulnerabilities and exposures. Moreover, in accordance with example implementations, the servers 180 may provide information that may be used by the risk assessment engine 134 to infer trust and/or security levels of the components, such as, for example, information about software communities and portals affiliated with the software components.

As also depicted in FIG. 1, in accordance with example implementations, the server 100 may communicate with one or multiple databases 170. In general, the databases 170 represent databases that may be part of an enterprise network associated with the server 100, as well as publicly available databases. For example, in accordance with some implementations, the databases 170 may include a knowledge database that is part of an enterprise network containing the server 100 and stores information regarding software components, as further described herein. As another example, in accordance with some implementations, the databases 170 may include a Common Vulnerabilities and Exposures (CVE) database, such as the CVE database that is maintained by the Mitre Corporation. The CVE database contains entries for publicly known vulnerabilities and exposures of publicly available software components. An entry of the CVE database may contain such information as information about a certain software component, such as a name of the software component, a source of the software component, one or multiple affected version numbers of the software product corresponding to the entry, and so forth. The entry may describe aspects about a specific vulnerability or exposure of the software component, such as a vulnerability classification, specific source code and inputs affected, and so forth. Moreover, the entry may provide a reference to a publicly available source (such as one of the servers 180 of FIG. 1, for example) more information on the vulnerability or exposure.

Figure 2:
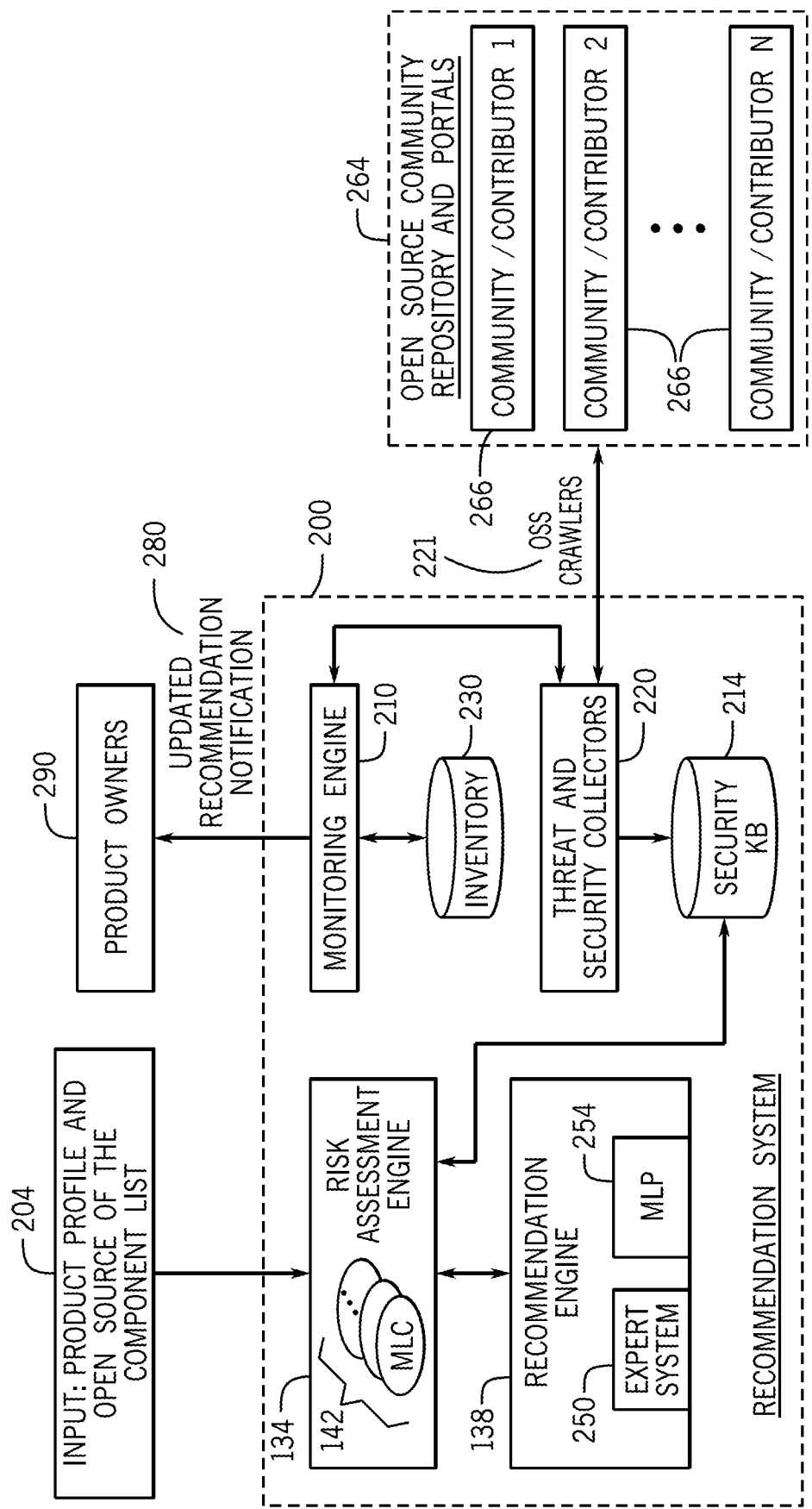
FIG. 2 is a schematic diagram of a security recommendation system to evaluate a software component and provide recommendations for the use of the component according to an example implementation.

FIG. 2 depicts an example implementation of a security recommendation system 200. For the proceeding example implementations that are described herein, the security recommendation system 200 evaluates open source software components and the potential products that may incorporate these open source software components; and the security recommendation system 200 provides corresponding recommendations based on these evaluations. It is noted that, however, in accordance with further example implementations, the security recommendation system may provide recommendations for software components (e.g., third party software components) other than open source software components.

Referring to FIG. 2, the risk assessment engine 134, in accordance with example implementations, receives an input 204 that describes a profile of a software product and a list of candidate open source software components to be included in the software product. In general, the risk assessment engine 134 is responsible for assessing and calculating the overall risks associated with each open source software component of the list. A given enterprise may have many different software products that handle many different kinds of data and have many different types of security contexts (e.g., confidential, private, proprietary, sensitive, public, and so forth). As such, whether a particular open source software component is suitable for a given software product may depend on a number of different factors that affect the overall risk of using the software component in the software product. As described herein, in accordance with some implementations, the risk assessment engine 134 generates a score that represents an overall risk for an open source software component.

In the context of this application, a "score" refers to a quantitative assessment or a qualitative assessment. For example, in accordance with some implementations, a "score" may be a number (e.g., an integer or a real number) in the range of zero to one hundred. For example, a trust score of "90" may represent a higher degree of trust than a trust score of "30" in this range. Instead of a number, however, a particular score may be a classification out of a group of classifications. For example, a score may be the classification of "low" out of a group of classifications, such as "low," "medium," and "high."

In accordance with example implementations, the risk assessment engine 134 determines a trust score for the open software component based on a number of parameters and further determines a security level score for the open source software component based on a number of parameters; and the risk assessment engine determines an overall risk score for the open source software component based on the determined trust and security level scores. In accordance with some implementations, the risk assessment engine 134 determines the overall risk score for the open source software component as an inverse function of the security level and trust scores. For example, the overall risk score may be higher (e.g., an overall risk score of "90" when a numeric range of "0 to 100" is used or "high" for the qualitative levels of "low," "medium" and "high") when the security level score is relatively low (e.g., security level score of "30" when a numeric range of "0 to 100" is used or "low" for the qualitative levels of "low," "medium" and "high") and the trust score (e.g., a trust score of "40" when a numeric range of "0 to 100" is used or "low" for the qualitative levels of "low," "medium" and "high") is relatively low.

In accordance with some implementations, to handle complex scenarios including the unavailability of certain parameters pertaining to security level and trust, the relatively large number of parameters pertaining to security level and trust, and the fact that the set of parameters to be used to determine trust and security may change over time due to an ever changing security threat landscape, the risk assessment engine 134 may use one or multiple machine learning classifiers 142. For example, in accordance with some implementations, the risk assessment engine 134 may use a particular machine learning classifier 142 to determine an overall risk score (e.g., a particular risk score level, such as "high," "medium," or "low") for all open source software components. In further example implementations, the risk assessment engine 134 may select the particular machine learning classifier 142 based on a class (e.g., network communications) of the open source software component and use the selected machine learning classifier 142 to determine an overall risk score for the open source software component.

The machine learning classifier 142 may be, for example, a supervised trained classifier that has a machine learning model that is trained using a classification algorithm, such as a decision tree or a random forest algorithm. The machine learning classifier 142 determines the overall risk score based on the values of parameters that represent trust and security related features of the open source software component. In accordance with some implementations, the machine learning classifier 142 may replace any missing values (e.g., values pertaining to feature parameters that are unavailable for a particular open source software component) with median, mode and/or mean values during a data cleansing operation. The machine learning classifier 142 may be trained (i.e., its model may be trained) using, for example, trust and security level feature parameters associated with relatively well-known open source software components with the overall risk score being assigned by a subject matter expert. The machine learning classifier 142 may then use its trained model to determine an overall risk score for a new open source software component as part of an inference use case.

The risk assessment engine 134 may, in accordance with example implementations, derive more accurate risk scores, assign different weights to the trust and security level parameters. In this manner, the assigned weight to a given parameter may be dependent on the associated relative importance of that factor to the corresponding security score and/or trust score. As such, a larger weight (i.e., a larger weight value) may correspond to a higher importance for the factor, as opposed to a lower weight (i.e., a lower weight value) corresponding to a relatively less important factor. Moreover, in accordance with example implementations, the risk assessment engine 134 may normalize parameter values to address the use of different parameter ranges by different parameter sources.

The recommendation engine 138 receives the overall risk score for an open source software component from the risk assessment engine 134, and in accordance with example implementations, the recommendation engine 138 provides a recommendation based on the overall risk score and a security context for the component. In accordance with some implementations, the recommendation engine 138 may apply machine learning. This machine learning may involve the use of machine learning classifiers or artificial intelligence models (i.e., machine learning predictors 254) that serve as predictors instead of classifiers. In general, the risk assessment provided by the risk assessment engine 134 and the corresponding recommendations by the recommendation engine 138 may be dynamically configurable and tunable based on the changing security threat landscape and open source ecosystem understanding. Moreover, as depicted at reference numeral 250 in FIG. 2, the recommendation system 250 may use input from human experts for such purposes as training the machine learning predictors 254, providing feedback for the recommendations to adaptively refine the machine learning predictors 254, and in general, provide a level of quality control for the recommendations that are provided by the recommendation engine 138.

As an example, the following is a sample illustration of the overall risk score, the corresponding acceptable overall risk scores and the corresponding security contexts for open source software products:

TABLE 1

| Product Security Context Requirements | Acceptable Overall Risk Score | Overall Risk Score = !(Overall Trust and Security Level) |
| --- | --- | --- |
| High | High | Low |
| Med | High, Med | Low, Medium |
| Low | High, Med, Low | Low, Medium, High |

In Table 1, for this example, the overall risk score is the inverse of the trust and security level scores.

The recommendation engine 138 may, in accordance with example implementations, apply a set of rules to determine the recommendations based on the security context; overall risk score; component trust parameters; and component security parameters. For example, in accordance with some implementations, the rules and the corresponding recommendations might be as follows:

If ((overall component risk score=low) and (product security context=high)), recommend not using the open source software component and propose an alternate software component If ((overall component risk score=medium) and (product security context=high)), recommend using the open source software component with mitigation measure(s)

If (community obsolescence=yes), recommend not using the open source software component If ((product not in security database 214, as further described below), (but present in a trust repository)), recommend usage with standard SDL practices (e.g., malware scanning, verification of downloaded hash, etc.)

If ((SDL maturity=low) and (product security context=medium)), recommend mitigation measure(s) (e.g., static analysis of code, malware scanning of binary, and so forth)

As depicted in FIG. 2, in accordance with some implementations, the security recommendation system 200 includes a security knowledge database 214, which stores security and trust parameters for a list of open source software components. In accordance with example implementations, a given entry in the knowledge database 214 is associated with a particular open source software component and contains various associated security and trust parameters that helps determine the overall risk score, the security level score and the trust score, as described herein. As examples, these parameters may include a large variety of different attributes, such as a community/contributor reputation, a community/component obsolescence rating, a component vulnerability management (e.g., number of open critical security vulnerabilities), a responsiveness to patch new CVE entries, component security assurance features (e.g., if binaries are signed and if the certificate used for signing is from a trusted CA), an SDL maturity (e.g., availability of SDL certifications/badges), a trustworthiness of the repository from which the open source software component is obtained, and so forth.

In general, in accordance with example implementations, the knowledge database 214 may be a dynamically populated database using a combination of automated threat and security collector components 220, such as security collectors (e.g., open source software (OSS) crawlers 221). As depicted in FIG. 2, this may involve the automated crawling of open source community repositories and portals 264, such as certain communities/contributors 266. Moreover, in accordance with example implementations, the security database 214 may include manually entered entries with specific knowledge of the open source software components. In accordance with example implementations, the security database 214 may contain a list of trusted open source software components and corresponding communities based on recommendations from trusted entities; a list of secure and popular software products; a list of government organizations (e.g., the Department of Defense) that are implicitly trusted and are part of a web of trust for open source software component securities; and so forth. In accordance with some implementations, the security database 214 may include a whitelist of open source software components In accordance with some implementations, the security recommendation system 200 includes an inventory repository 230, which contains data representing the product specific open source inventory for the latest released product versions. This centralized repository may be regularly updated, for example, after every product release, to ensure the latest snapshot of the open source software component inventory for registered products.

In accordance with some implementations, the security recommendation system 200 includes a monitoring engine 210 that continuously monitors and accesses risks (e.g., community obsolescence, community trust rating, and so forth) associated with registered and active open source components that are stored in the inventory 230. In accordance with some implementations, the threat and security collectors 220 may periodically mine information from popular and/or preconfigured portals and component repositories to gather information that helps update the security level and trust parameters associated with the open source software components. In accordance with example implementations, the monitoring engine 210 evaluates the security risks of the open source software components that are stored in the inventory 230 using the risk assessment engine 134 and the recommendation engine 138 and notifies product owners 290 of anticipated risks and recommended mitigations at regular intervals, as depicted at reference numeral 280.

As an illustration of the interaction between the components of the security recommendation system 200, in accordance with some implementations, a product team may provide input 204 of a profile of a particular software product, including specific security needs of the product and a list of candidate open source software components to be potentially used in the software product. The risk assessment engine 134, in accordance with example implementations, parses the input 204 and uses the knowledge database 214 to retrieve various security level parameters and trust parameters associated with each open source software component on the list. If a particular open source software component is not in the knowledge database 214, then, in accordance with example implementations, the risk assessment engine 134 may generate a notification (i.e., an alert) for manual intervention. Moreover, in accordance with the example implementations, the threat and security collectors 220 are triggered to initiate and mine security specific information about this open source software component from preconfigured repositories and web portals. If a given open source software component is present in the knowledge database 214, then the risk assessment engine 134 retrieves the parameters and uses them to determine the security level score, the trust score and the overall risk score for the open source software component.

In general, the overall risk scores and output of the expert system 250 with the corresponding recommendations may be communicated back to the user who submitted the input 204. In accordance with example implementations, this output may contain a risk assessment score for each open source software component (e.g., a score of "high," "medium," or "low"); the final recommendation (e.g., the open source software component is fit to use, use the open source software product with certain mitigation, the open source software component is not fit to use, etc.); and the mitigation control details and guidelines that are to be followed to securely onboard the open source software component. As examples, the mitigation controls may be a malware scanning of binaries; the use of source code instead of binaries due to the lack of signature verification features; recommended alternate open source software components that may be perhaps more secure and meet product specific needs; and so forth.

Figure 3A:
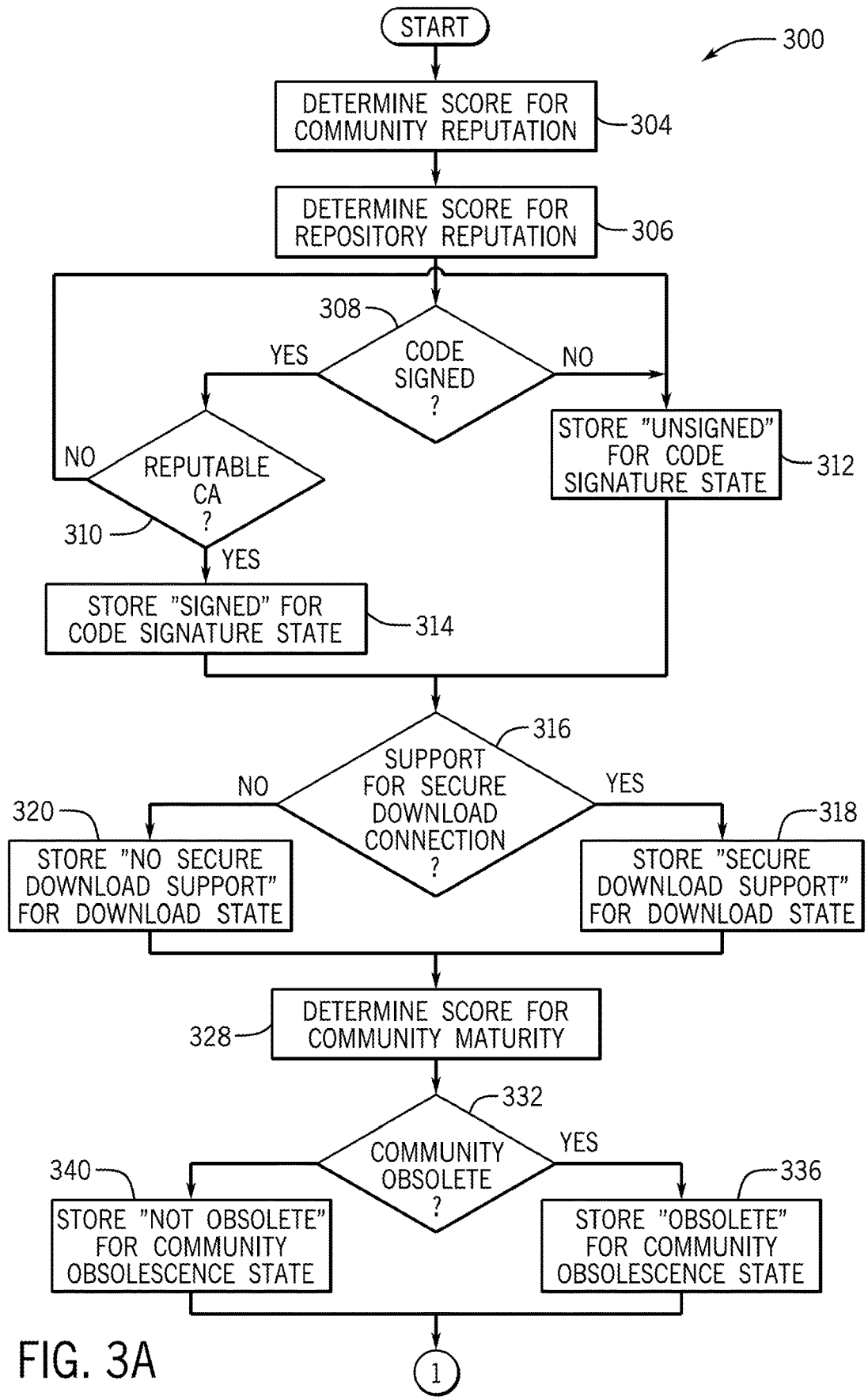
FIGS. 3A and 3B depict a flow chart illustrating a process to determine a trust score for a software component according to an example implementation.
Figure 3B:
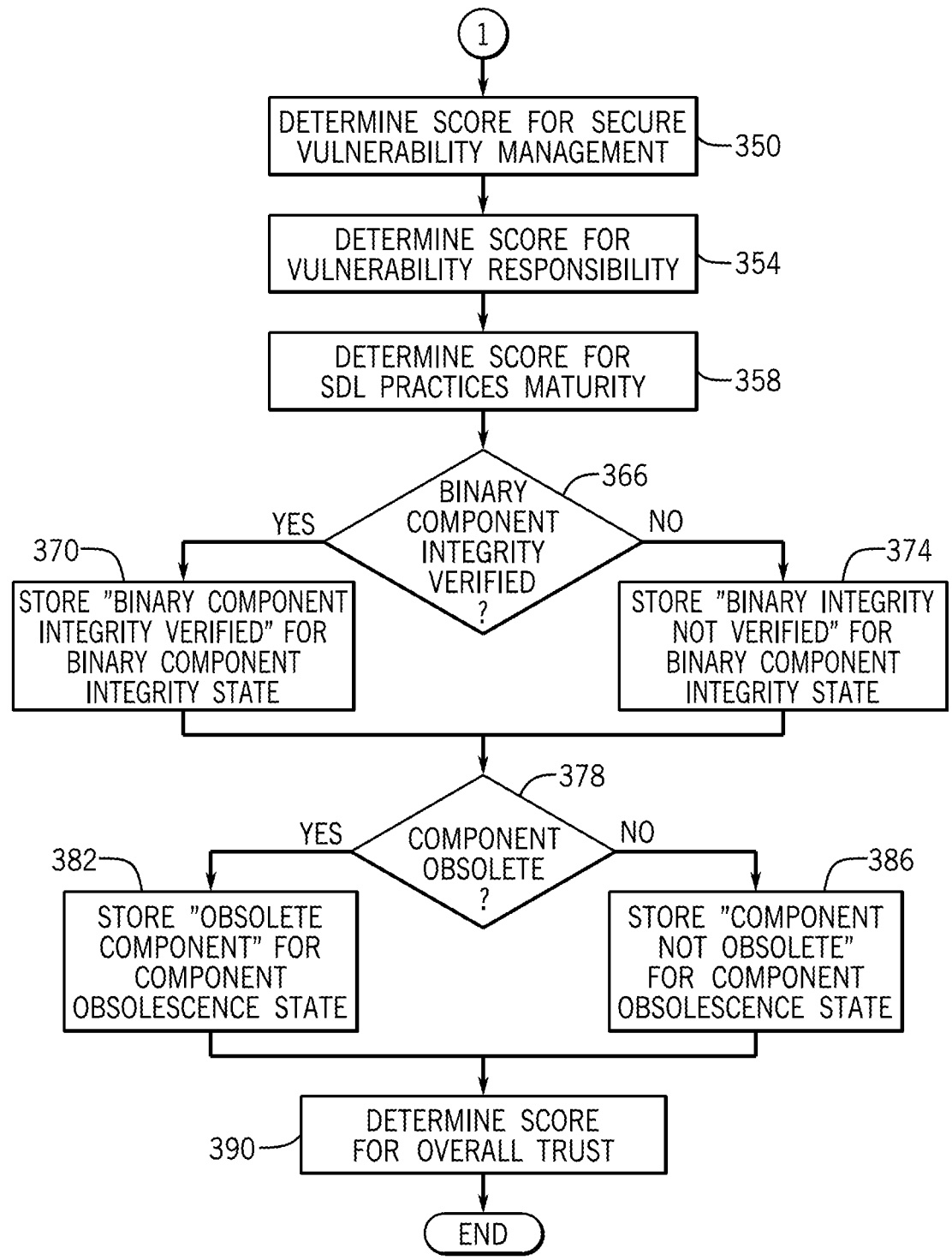

FIGS. 3A and 3B depict a process 300 that may be used by the risk assessment engine 134 for purposes of determining a trust score for a given software component. Referring to FIG. 3A in conjunction with FIG. 2, in accordance with some implementations, pursuant to the process 300, the risk assessment engine 134 determines (block 304) a score for a community reputation of the open source software component. For example, in accordance with some implementations, this score may be a score in a range (zero to one hundred) or a qualitative categorization of "low," "medium," or "high." Pursuant to block 306, the risk assessment engine 134 determines a score for the reputation of the repository affiliated with the open source software component, which may be a quantitative or a qualitative score.

Pursuant to the process 300, the risk assessment engine 134 may, as part of the trust evaluation, determine (decision block 308) whether the code has been signed. If not, then, pursuant to block 312, the risk assessment engine 134 may update a corresponding state to indicate that the code has not been signed. If the code is signed, then, in accordance with example implementations, the risk assessment engine 134 determines (decision block 310) whether the code has been signed by a reputable certificate authority (CA), and if not, the risk assessment engine 134 stores (block 312) a no signature state for the open source software component. Otherwise, if the code has been signed by a reputable CA, then, pursuant to block 314, the risk assessment engine 134 stores the signed code signature state.

The risk assessment engine 134 may also determine (decision block 316) whether there is support for a secure download connection for the open source software component. If so, the risk assessment engine 134 stores (block 318) a "secure download support" for the state and otherwise stores a "no secure support" for the state. The risk assessment engine 134 may further determine (block 328) a score for community maturity associated with the open source software component. For example, in accordance with some implementations, this score may be a "qualitative score of "low," "medium," or "high." For example, a score of "high" may indicate that the community is well known in the industry, has been around for more than a certain number of years (e.g., more than three years), has a relatively good track record for innovation and execution, utilizes well-defined SDL best practices, and is recommended by trusted entities (e.g., recommended by governmental agencies). A score of "medium" may indicate that the community is known, has been around for a certain number of years (e.g., has been around for more than one year) and has known usage and a few popular products. A score of "low" may indicate that the open source software component has been around for less than a predetermined time (e.g., less than one year), and there is no evidence of use of the product in any trusted products or by trusted entities.

As part of the evaluation of the trust score, the risk assessment engine 134 may further determine (decision block 332) whether the community that is affiliated with the open source software component is obsolete. If so, then the risk assessment engine 134 stores an indication of "obsolete" for the corresponding state, pursuant to block 336, or, if the community is not obsolete, stores a corresponding indication of not obsolete for the community and the corresponding state, pursuant to block 340. It is noted that, in accordance with example implementations, community obsolescence risks may be a relatively important factor, as it means that if the community is obsolete, then there may be reduced or nonexistent security updates for the open source software component. Determining whether the community is obsolete may involve evaluating metrics, such as current activity in the community, the funding associated with the community, the extent of the community support system, and so forth.

Referring to FIG. 3B, the evaluation of the trust score for the open source software component may further include determining (block 350) a score for secure vulnerability management. This may involve evaluating a score in a particular range (e.g., zero to one hundred) or a qualitative categorization. For this evaluation, in accordance with example implementations, the risk assessment engine 134 may evaluate such metrics as the number of active CVEs, the number of noted security defects, the activity of changes to the CVE database, the number of commits to the CVE database, the release note management, and so forth.

Pursuant to block 354, the risk assessment engine 134 may further evaluate a vulnerability responsiveness score. This may be either a numerical number or a qualitative level, depending on the particular implementation. In general, this score may be evaluated using, for example, response times to patch vulnerabilities identified in the CVE database.

Pursuant to block 358, in accordance with example implementations, the risk assessment engine 134 may determine a score for the SDL practice maturity. This may either be a numeric or qualitative score, depending on the particular implementation. This score may be based on, for example, the existence of documented established security aspects of the SDL practices, such as static analysis, security features, security trained contributors, and so forth.

The evaluation of the trust score may further include, as depicted in decision block 366, a determination of whether there is a binary component integrity verification mechanism. Depending on whether there is or is not, a corresponding state may be updated, pursuant to decision blocks 370 and 374, respectively.

The security risk assessment engine 134 may further determine (decision block 378) whether the open source software component is obsolete and update a state (decision block 382 indicating that the component is obsolete or decision block 386 indicating that the component is not obsolete) accordingly. The obsolescence risk score may be determined based on such factors as the number of commits to the CVE database over a period of time, the number of downloads of the open source software components, the number of releases of the open source software component, as well as other metrics.

It is noted that the parameters that are discussed above are merely examples, as the risk assessment engine 134 may determine additional and/or other parameters and base a trust score on such other/additional parameters, in accordance with further implementations. Moreover, although FIGS. 3A and 3B depict a sequential determination of the parameters, these parameters may be determined in any order, may be performed in parallel, and so forth. Regardless of the actual parameters that are used, pursuant to block 390, the risk assessment engine 134 determines a score representing the degree of overall trust of the open source software component based on the parameters.

Figure 4:
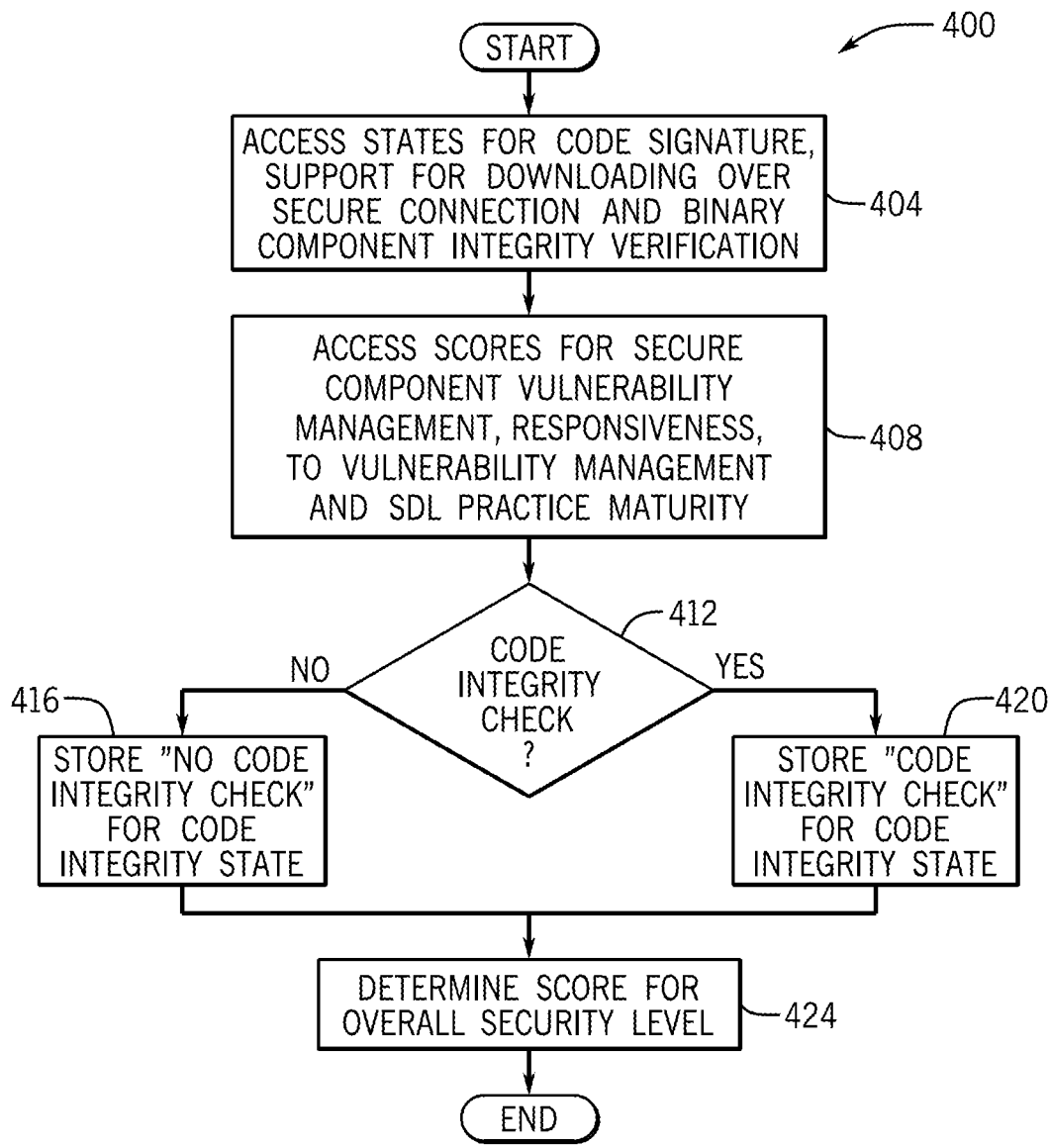
FIG. 4 is a flow diagram depicting a process to determine a security level score for a software component according to an example implementation.

FIG. 4 depicts a process 400 that may be used by the risk assessment engine 134 to determine a security level score for an open source software component, in accordance with example implementations. Referring to FIG. 4 in conjunction with FIG. 2, in accordance with some implementations, the process 400 includes accessing (block 404) states that were determined as part of the trust score determination, such as, for example, the states for the code signature, support for downloads over secure connections, binary component integrity verification, and so forth. Pursuant to block 408, the risk assessment engine 134 also accesses scores that were determined in the determination of the trust score, such as the secure component vulnerability management score, the responsiveness to vulnerability management score and the SDL practice maturity score.

In accordance with example implementations, the risk assessment engine 134 determines information other than the states and scores mentioned above for purposes of assessing the security level for the open source software component. For example, as depicted in decision block 412, the risk assessment engine 134 determines whether there is a code integrity check, and if so, stores this state (block 420) or otherwise stores a state indicating that there is no code integrity check, pursuant to block 416. The risk assessment engine 134 may then determine a score for the overall security level of the open source software component, pursuant to block 424.

The risk assessment engine 134 may determine the score for the overall security level of the open source software component based on additional and/or different security parameters, in accordance with further implementations. For example, in accordance with some implementations, the risk assessment engine 134 may determine an encryption support provided by an open source software component and also determine the security protocol(s) and cipher(s) that are used by the component for this encryption support. Although not relevant for all open source software components, the encryption support provided by some components (e.g., components that process and/or communicate information pertaining to confidential or sensitive information, such as medical information, banking information, human resource (HR) information, customer information for merchants, credit card information, and so forth) and the ciphers used by these components may be important to achieve confidentiality and integrity for the components. In accordance with some implementations, the risk assessment engine 134 may determine a trust score for an open source software component based on the strength of the security protocols and/or ciphers used by the component. In this manner, the risk assessment engine 134 may have knowledge of different strengths for different security protocols and ciphers and correspondingly assign higher trust scores to open source software components that use relatively higher strength security protocols and ciphers.

Figure 5:
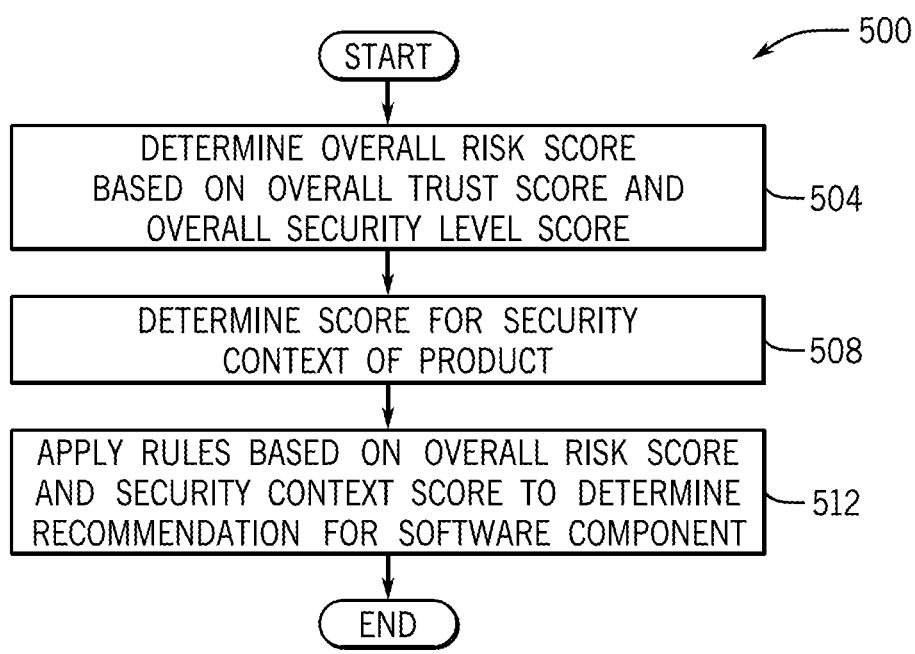
FIG. 5 is a flow diagram depicting a process to determine a recommendation for a software component by applying rules based on an overall risk score for the software component and a security context for the software component according to an example implementation.

FIG. 5 depicts an example process 500 that may be used by the security recommendation system 200 (FIG. 2) for purposes of arriving at a recommendation for a particular open source software component. Referring to FIG. 5 in conjunction with FIG. 2, the process 500 includes the risk assessment engine 134 determining (block 504) an overall risk score for the open source software component based on the trust score and the security level score for the open source software component. The recommendation engine 138 determines (block 508) a score for a security context of the product. For example, in accordance with some implementations, the security context score may be one of three levels (e.g., low, medium or high). Based on the security context and the overall risk score, in accordance with example implementations, the recommendation engine 138 applies rules to determine a recommendation for the software component, as depicted in block 512.

Figure 6:
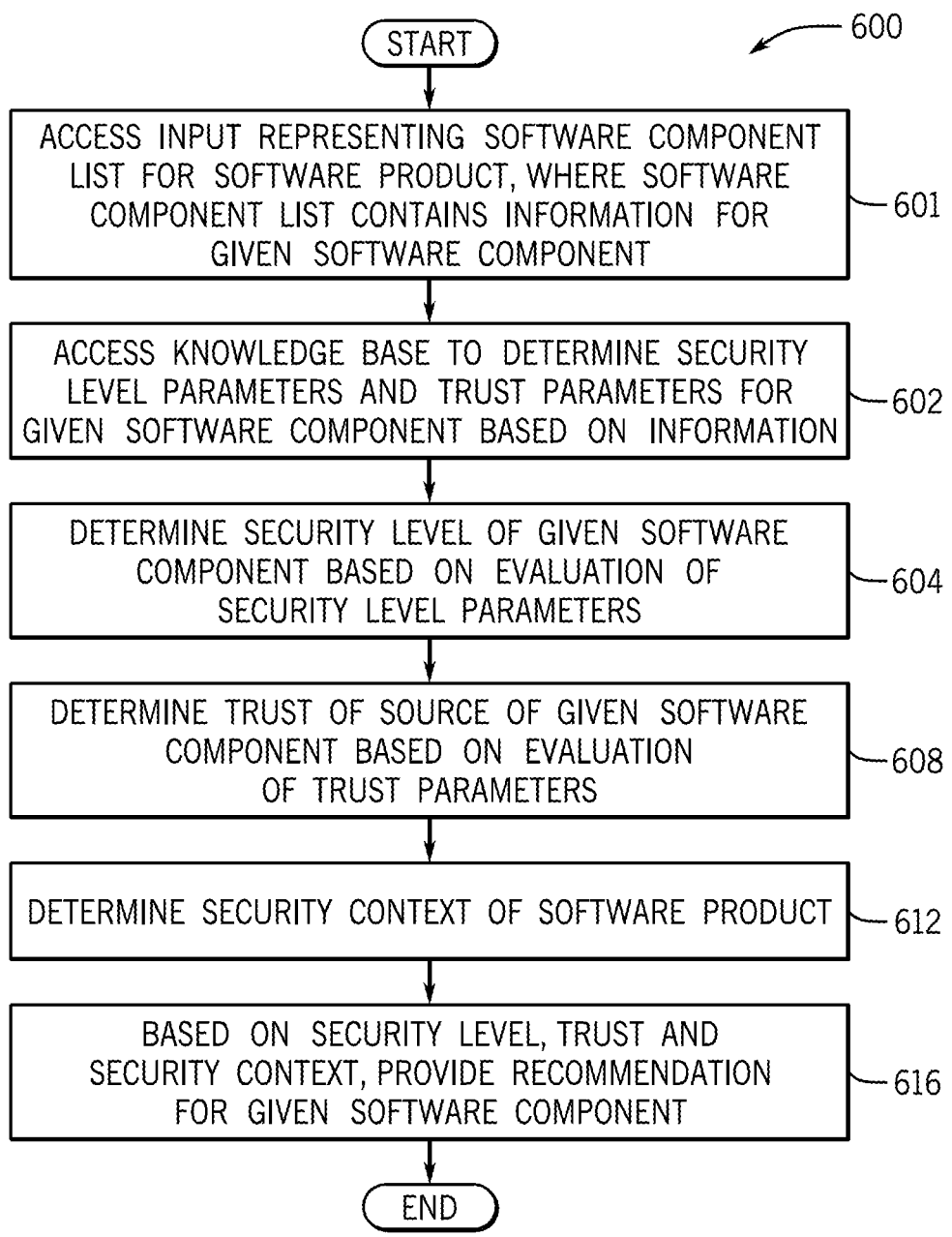
FIG. 6 is a flow diagram depicting a process to provide a recommendation for a software component according to an example implementation.

Referring to FIG. 6, in accordance with example implementations, a process 600 includes accessing (block 601) an input representing a software component list for a software product. The software component list contains information for a given software component. The method includes accessing (block 602) a knowledge base to determine security level parameters and trust parameters for the given software component based on the information. Pursuant to block 604, a security level of the given software component is determined based on an evaluation of the security level parameters; and pursuant to block 608, a trust of a source of the given software component is determined based on an evaluation of the trust parameters. The process 600 includes determining (block 612) a security context of the software product. Based on the security level, the trust and the security context, the process 600 includes providing (block 616) a recommendation for the given software component.

Figure 7:
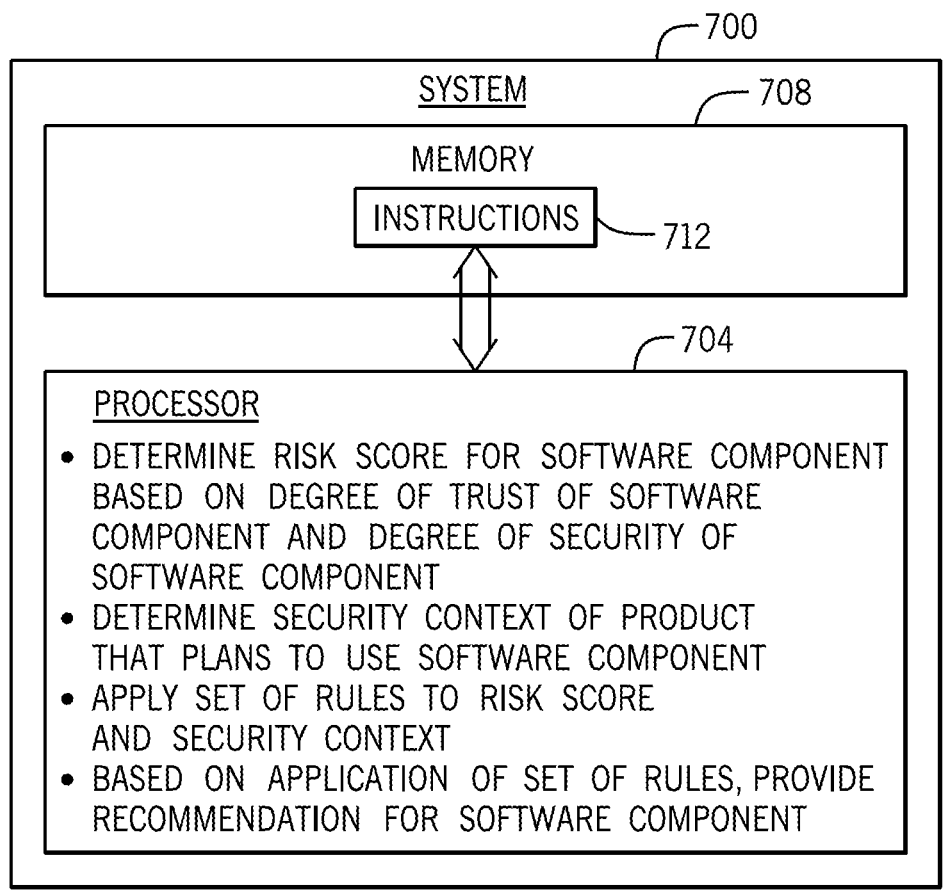
FIG. 7 is a schematic diagram of a system to provide a recommendation for a software component according to an example implementation.

Referring to FIG. 7, in accordance with example implementations, a system 700 includes a processor 704 and a memory 708. The memory 708 stores instructions 712 that, when executed by the processor 704, cause the processor 704 to determine a risk score for a software component based on a degree of trust of the software component and a degree of security of the software component; and determine a security context of a product that plans to use the software component. The instructions 712, when executed by the processor 704, further cause the processor to apply a set of rules to the risk score and the security context; and based on the application of the set of rules, provide a recommendation for the software component.

Figure 8:
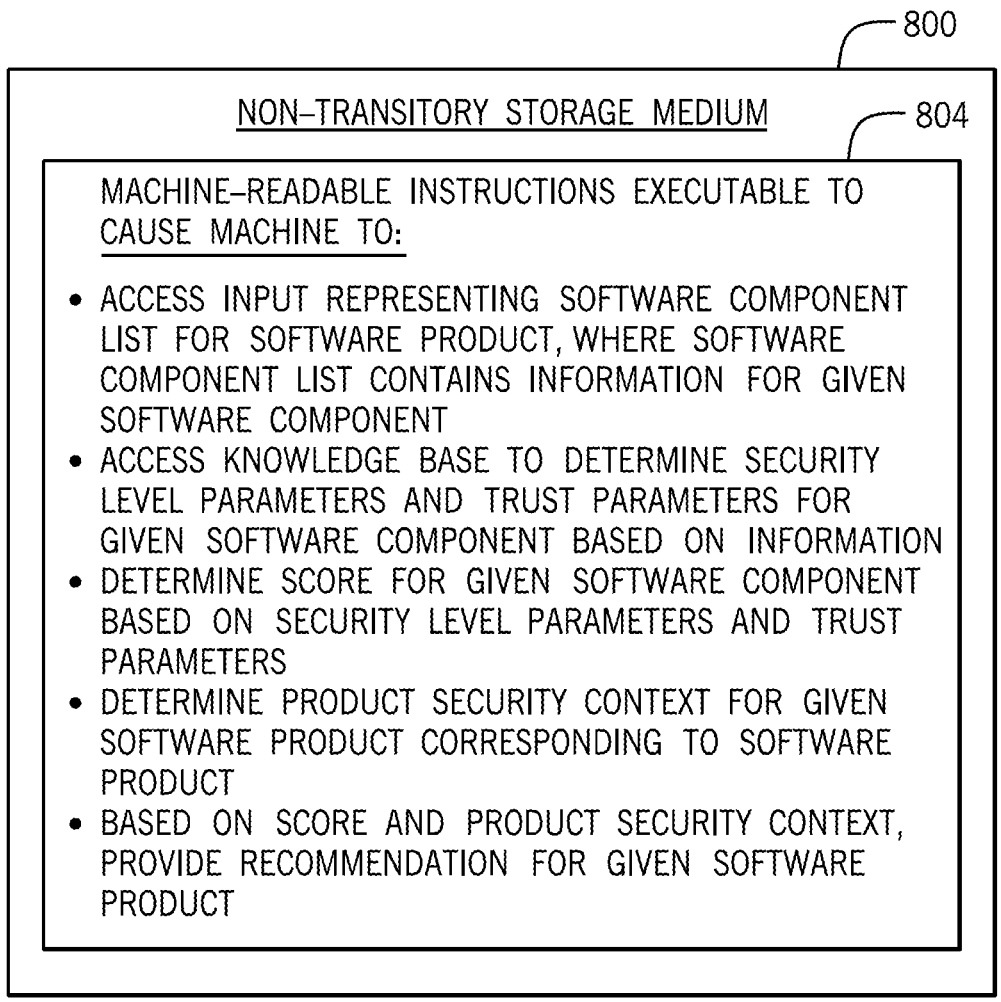
FIG. 8 is an illustration of a machine-readable storage medium that stores machine-executable instructions that, when executed by a machine, cause the machine to provide a recommendation for a software product according to an example implementation.

Referring to FIG. 8, in accordance with example implementations, a non-transitory storage medium 800 stores instructions 804 that, when executed by the machine, cause the machine to access an input representing a software component list for a software product, wherein the software component list contains information for a given software component; accessing a knowledge base to determine security level parameters and trust parameters for the given software component based on the information; and determine a score for the given software component based on the security level parameters and the trust parameters. The instructions 804, when executed by the machine, further cause the machine to determine a product security context for the given software product and based on the score of the product security context, provide a recommendation for the given software product.

In accordance with example implementations, providing the recommendation includes at least one of recommending a security control used with the software component or recommending a scanning or security validation for the software component. A particular advantage is that approval of the use of the software component may include risk mitigation controls.

In accordance with example implementations, determining the security context includes at least one of determining a security level, determining an industry corresponding to the product, determining an information technology (IT) classification for the software component, determining a level of exposure, or determining a user access privilege associated with the software component. A particular advantage is that actual security requirements needs for the software product that incorporates the software component may be considered in arriving at the recommendation for the software component.

In accordance with example implementations, the method may further include determining an overall risk score based on the trust and the security level; and determining the recommendation based on the overall risk score. A particular advantage is that the security posture of software products may be improved.

In accordance with example implementations, determining the overall risk score includes identifying first components of the trust having associated lower trust levels than other components of the trust; and identifying second components of the security level having associated security levels higher than other security levels; and determining the overall risk score based on the first components and the second components. A particular advantage is that the security posture of software products may be improved.

In accordance with example implementations, determining the overall risk score includes assigning a first plurality of weights to components of the trust to provide a first plurality of values; assigning a second plurality of weights to components of the security level to provide a second plurality of values; and determining the overall risk score based on the first plurality of weighted values and the second plurality of weighted values. A particular advantage is that more importance may be attributed to more important or relevant trust components and security level components.

In accordance with example implementations, determining the recommendation includes determining the recommendation based on a set of rules, where a given rule of the set of rules results in a given recommendation based on a comparison of the overall risk score to an overall risk score level and a comparison of the security context to a security context level. A particular advantage is that rules may be developed to deterministically provide the recommendations based on levels and scores set through experts and possibly machine learning.

In accordance with example implementations, determining the overall risk score may use machine learning. A particular advantage is that unknown relationships may be learned and applied through the use of machine learning.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   accessing an input representing a software component list for a software product, wherein the software component list contains information for a given software component;
   accessing a knowledge base to determine at least some security level parameters and trust parameters for the given software component based on the information, wherein:
     the trust parameters represent at least one of whether the source code is signed, whether there is support for a secure download connection, or whether a community associated with the software component is obsolete; and
     at least one parameter of the security level parameters and the trust parameters is unavailable;
   applying a machine learning classifier to infer the at least one parameter;
   determining a security level of the given software component based on an evaluation of the security level parameters;
   determining a trust of a source of the given software component based on an evaluation of the trust parameters;
   determining a security context of the software product; and
   based on the security level, the trust and the security context, providing a recommendation for the given software component.

2. The method of claim 1, wherein providing the recommendation comprises at least one of recommending a security control to use with the given software component, or recommending a scanning validation for the given software component.

3. The method of claim 1, wherein determining the security context comprises at least one of determining a security level from a plurality of security levels, determining an industry corresponding to the software product, determining an information technology (IT) classification for the given software component, determining a level of exposure, or determining a user access privilege associated with the given software component.

4. The method of claim 1, further comprising:
   determining an overall risk score based on the trust and the security level; and
   determining the recommendation based on the overall risk score.

5. The method of claim 4, wherein determining the overall risk score comprises:
   identifying first components of the trust;
   identifying second components of the security level having associated security levels higher than other security levels; and
   determining the overall risk score based on the first components and the second components.

6. The method of claim 4, wherein determining the overall risk score comprises:
   assigning a first plurality of weights to components of the trust to provide a first plurality of values;
   assigning a second plurality of weights to components of the security level to provide a second plurality of values; and
   determining the overall risk score based on the first plurality of weighted values and the second plurality of weighted values.

7. The method of claim 4, wherein determining the overall risk score comprises applying machine learning.

8. The method of claim 4, wherein determining the recommendation comprises determining the recommendation based on a set of rules, wherein a given rule of the set of rules results in a given recommendation based on a comparison of the overall risk score to an overall risk score level and a comparison of the security context to a security context level.

9. The method of claim 4, wherein determining the recommendation comprises determining the recommendation based on a set of rules, wherein a given rule of the set of rules results in a given recommendation based on a comparison of a first component of the trust to a predetermined trust level for the first component and a comparison of a second component of the security context to a predetermined security context level for the second component.

10. The method of claim 1, wherein providing the recommendation comprises providing an action to mitigate an overall risk of the given software component.

11. A system comprising:
   a processor; and
   a memory to store instructions, that when executed by the processor, cause the processor to:
     determine a degree of trust of a software component based on security level parameters;
     determine a degree of security of the software component based on security level parameters, wherein:
       the trust parameters represent at least one of a repository reputation of the software component, a maturity of a community associated with the software component, a reputation of a certificate authority signing the software component, support for download of the software component over a secure connection, whether the community is obsolete, common vulnerabilities and exposures (CVEs) vulnerability management practices, a responsiveness to new CVE entries, a maturity of documented safe download practices corresponding to the software component, support for integrity verification of the software component, or an obsolescence risk of the software component; and at least one parameter of the security level parameters and the trust Parameters is unavailable;

apply a machine learning classifier to infer the at least one parameter;

determine a risk score for the software component based on the degree of trust and the degree of security;

determine a security context of a product that plans to use the software component;

apply a set of rules to the risk score and the security context; and based on the application of the set of rules, provide a recommendation for the software component.

12. The system of claim 11, wherein the security level parameters represent at least one of a reputation of a certificate authority signing the software component, support for download of the software component over a secure connection, common vulnerabilities and exposures (CVEs) vulnerability management, a responsiveness to new CVE entries, a maturity of documented safe download practices corresponding to the software component, support for integrity verification of the software component, or an obsolescence risk of the software component.

13. The system of claim 11, wherein the instructions, when executed by the processor, further cause the processor to:

determine the degree of trust and the degree of security based on information contained in a knowledge repository; and acquire the information stored in the knowledge repository using crawlers of open source repositories.

14. A non-transitory machine-readable storage medium that stores machine executable instructions that, when executed by a machine, cause the machine to:

access an input representing a software component list for a software product, wherein the software component list contains information for a given software component;

access a knowledge base to determine security level parameters and trust parameters for the given software component based on the information, wherein:

the trust parameters represent at least one of whether the source code is signed, whether there is support for a secure download connection, or whether a community associated with the software component is obsolete; and at least one parameter of the security level parameters and the trust parameters is unavailable;

apply a machine learning classifier to infer the at least one parameter;

determine a score for the given software component based on the security level parameters and the trust parameters;

determine a product security context for the given software product; and based on the score and the product security context, provide a recommendation for the given software product.

15. The storage medium of claim 14, wherein the recommendation comprises an approval to use the given software product dependent on a recommended risk mitigation action, a recommendation to use the given software product without any risk mitigation actions, or a recommendation to not use the given software product.

16. The storage medium of claim 14, wherein the recommendation comprises the approval to use the given software product dependent on the recommended risk mitigation action, and the recommended risk mitigation action comprises a security action associated with downloading the given software product.

17. The storage medium of claim 14, wherein the recommendation comprises the approval to use the software product dependent on the recommended risk mitigation action, and the recommended risk mitigation action comprises a security analysis and a security validation of the given software product.

18. The storage medium of claim 14, wherein the recommendation comprises the approval to use the given software product dependent on the recommended risk mitigation action, and the recommended risk mitigation action comprises using a certificate authority to sign the given software product.

19. The storage medium of claim 14, wherein the recommendation comprises recommending not using the given software component and proposing another software component.

* * * * *